United States Patent
Klug et al.

(10) Patent No.: US 9,165,162 B2
(45) Date of Patent: Oct. 20, 2015

(54) PROCESSOR ARRANGEMENTS AND A METHOD FOR TRANSMITTING A DATA BIT SEQUENCE

(71) Applicant: Infineon Technologies AG, Neubiberg (DE)

(72) Inventors: Franz Klug, Aying (DE); Steffen Sonnekalb, Taufkirchen (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 251 days.

(21) Appl. No.: 13/729,052

(22) Filed: Dec. 28, 2012

(65) Prior Publication Data
US 2014/0189176 A1    Jul. 3, 2014

(51) Int. Cl.
*H04L 29/06* (2006.01)
*G06F 21/73* (2013.01)
*G06F 13/38* (2006.01)
*G06F 21/57* (2013.01)
*G06F 21/64* (2013.01)

(52) U.S. Cl.
CPC ........... *G06F 21/73* (2013.01); *G06F 13/38* (2013.01); *G06F 21/57* (2013.01); *G06F 21/64* (2013.01)

(58) Field of Classification Search
CPC ......... G06F 13/38; G06F 21/73; G06F 21/57; G06F 21/64
USPC .................. 713/189; 710/110, 107
See application file for complete search history.

(56) References Cited

U.S. PATENT DOCUMENTS

| | | | |
|---|---|---|---|
| 6,816,970 B2* | 11/2004 | Morgan et al. | 713/183 |
| 2001/0025343 A1* | 9/2001 | Chrisop et al. | 713/193 |
| 2005/0141704 A1* | 6/2005 | Van Der Veen | 380/28 |
| 2005/0141705 A1* | 6/2005 | Kao et al. | 380/37 |
| 2006/0082829 A1* | 4/2006 | Woods et al. | 358/3.03 |
| 2006/0247926 A1* | 11/2006 | Rousseau | 704/219 |
| 2010/0278533 A1* | 11/2010 | Julien et al. | 398/58 |
| 2011/0161943 A1* | 6/2011 | Bellows et al. | 717/149 |
| 2011/0161975 A1* | 6/2011 | Alexander et al. | 718/104 |
| 2011/0161976 A1* | 6/2011 | Alexander et al. | 718/104 |
| 2012/0310467 A1* | 12/2012 | Faucett et al. | 701/29.8 |
| 2013/0145166 A1* | 6/2013 | Hsien | 713/176 |

* cited by examiner

*Primary Examiner* — David Garcia Cervetti (57) ABSTRACT

A processor arrangement is provided. The processor arrangement includes: a first processor; a plurality of second processors, each second processor including a bit-mask generator configured to generate a processor-specific bit-mask sequence; wherein the first processor includes a bit-mask generator configured to generate the processor-specific bit-mask sequences of the second processors; wherein the first processor is configured to bit-mask a data bit sequence to be transmitted to one second processor of the plurality of second processors using a processor-specific bit-mask sequence specific to the one second processor, to thereby generate a processor-specific bit-masked data sequence to be transmitted to the one second processor.

21 Claims, 5 Drawing Sheets

PROCESSOR ARRANGEMENTS AND A METHOD FOR TRANSMITTING A DATA BIT SEQUENCE

TECHNICAL FIELD

Various embodiments relate generally to processor arrangements and a method for transmitting a data bit sequence.

BACKGROUND

Smart cards may transmit data between a CPU core and peripherals via a bus system. The data must be protected against attacks such as spying. The data may for these purposes, be provided with a dynamic mask. A successful external attack on a peripheral may make it possible to manipulate the peripheral, for example through error induction, so that the peripheral may accept certain data not intended for this peripheral. Furthermore, the dynamic mask may be removed from the data. Therefore, it may be possible for an attacker, during the manipulation to watch the data. Up till now, no known practical methods of preventing this are known.

SUMMARY

Various embodiments provide a processor arrangement, including: a first processor; a plurality of second processors, each second processor including a bit-mask generator configured to generate a processor-specific bit-mask sequence; wherein the first processor includes a bit-mask generator configured to generate the processor-specific bit-mask sequences of the second processors; wherein the first processor is configured to bit-mask a data bit sequence to be transmitted to one second processor of the plurality of second processors using a processor-specific bit-mask sequence specific to the one second processor, to thereby generate a processor-specific bit-masked data sequence to be transmitted to the one second processor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments provide a processor arrangement, wherein spying and/or attacks on peripheral slave circuits may be prevented.

Figure 1:
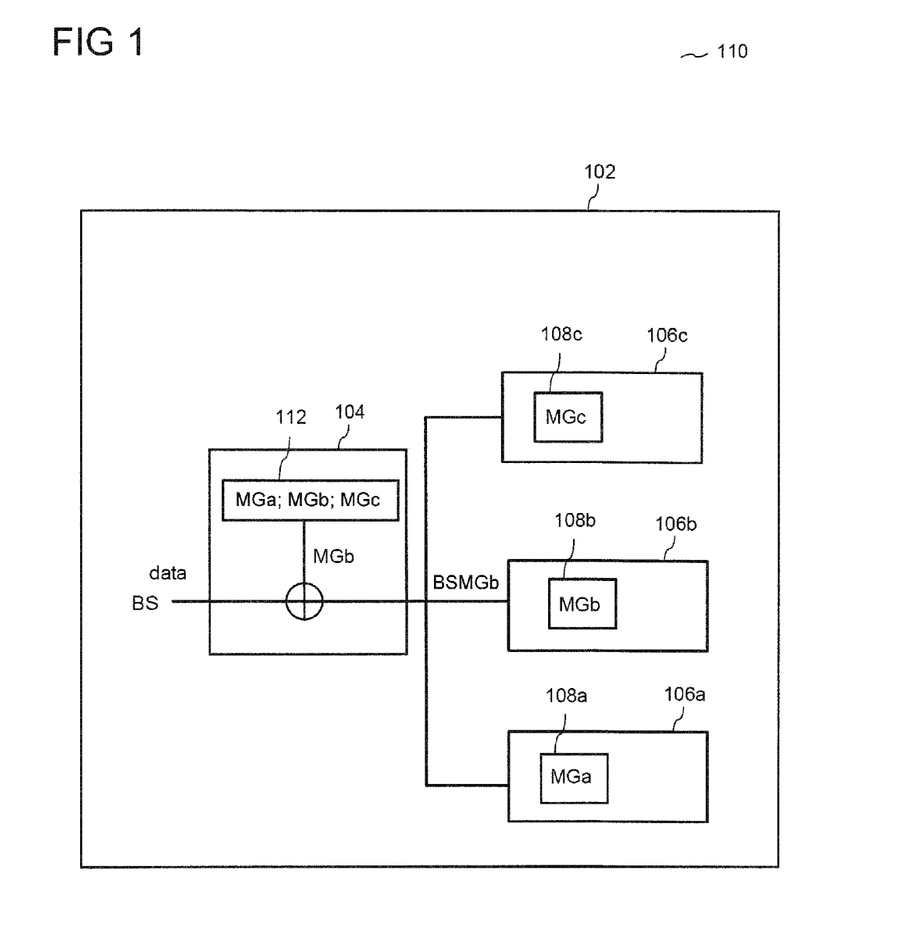
FIG. 1 shows a processor arrangement according to an embodiment.

FIG. 1 shows processor arrangement 102 according to an embodiment.

Processor arrangement 102 may include: first processor 104; plurality of second processors 106a, 106b, 106c, each second processor 106a, 106b, 106c including a bit-mask generator 108a, 108b, 108c configured to generate a processor-specific bit-mask sequence MGa, MGb, MGc; wherein first processor 104 may include bit-mask generator 112 configured to generate the processor-specific bit-mask sequences MGa, MGb, MGc of second processors 106a, 106b, 106c; wherein first processor 104 may be configured to bit-mask a data bit sequence BS to be transmitted to one second processor, e.g. 106b, of plurality of second processors 106a, 106b, 106c using a processor-specific bit-mask sequence e.g. MGb, specific to the one second processor e.g. 106b, to thereby generate a processor-specific bit-masked data sequence BSMGb to be transmitted to the one second processor, e.g. 106b.

It may be understood, that although only three second processors 106a, 106b, 106c are shown in FIG. 1, plurality of second processors may not be limited to three, but may include e.g. one, two, three, etc., or tens, or hundreds, or even more of second processors, wherein an upper limit in the number of processors may, for example, depend on the system size.

It may further be understood, that although the one second processor, is shown as an example in FIG. 1, to be one second processor 106b, it may be understood that one second processor, may refer to any one second processor, e.g. 106a, or e.g. 106c. In other words, for example, first processor 104 may be configured to bit-mask a data bit sequence BS to be transmitted to one second processor, e.g. 106a, of plurality of second processors 106a, 106b, 106c using a processor-specific bit-mask sequence e.g. MGa, specific to the one second processor e.g. 106a, to thereby generate a processor-specific bit-masked data sequence BSMGa to be transmitted to the one second processor, e.g. 106a.

Figure 2:
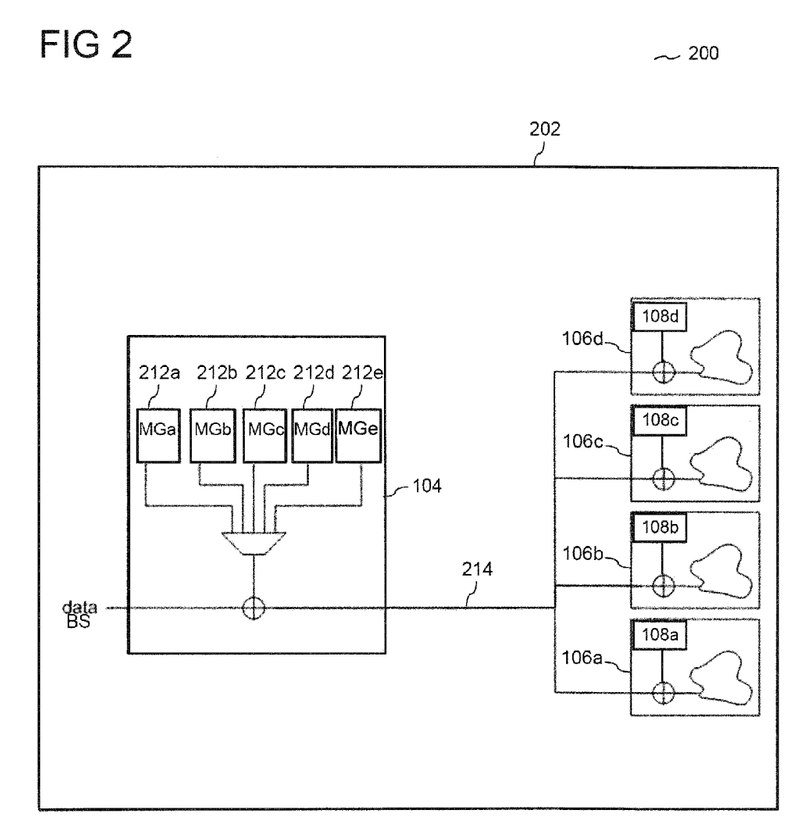
FIG. 2 shows a processor arrangement according to an embodiment.

FIG. 2 shows processor arrangement 202 according to an embodiment.

Processor arrangement 202 may include first processor 104 as already described with respect to the embodiment of FIG. 1. First processor 104 may include a central processing unit (CPU). For example, first processor 104 may include a CPU core.

Processor arrangement 202 may include plurality of second processors 106a, 106b, 106c, 106d each second processor 106a, 106b, 106c, 106d including a bit-mask generator 108a, 108b, 108c, 108d as already described with respect to the embodiment of FIG. 1.

First processor 104 and plurality of second processors 106a, 106b, 106c, 106d may be connected via one or more bus lines 214. First processor 104 may include a controller circuit, which may be configure to send controller circuit instructions to plurality of second processors 106a, 106b, 106c, 106d. First processor 104 may include a master processing circuit and plurality of second processors 106a, 106b, 106c, 106d may each include a slave processing circuit.

Each second processor 106a, 106b, 106c, 106d of plurality of second processors 106a, 106b, 106c, 106d may include a bit-mask generator 108a, 108b, 108c, 108d. For example, one second processor, e.g. 106a, may include one bit-mask generator, e.g. 108a. For example, one second processor, e.g. 106b, may include one bit-mask generator, e.g. 108b, and so forth.

Each bit-mask generator 108a, 108b, 108c, 108d may be configured to generate a processor-specific bit-mask sequence MGa, MGb, MGc, MGd. For example, one, bit-mask generator 108a, may be configured to generate a processor-specific bit-mask sequence, e.g. MGa. For example, bit-mask generator 108b, may be configured to generate a processor-specific bit-mask sequence, e.g. MGb, and so forth.

A processor-specific bit-mask sequence may refer to a bit-mask sequence which may be unique to the processor that had generated the bit-mask sequence and/or which may be unique to the processor which has been allocated the bit-mask sequence for use. For example, first processor 104 may include bit-mask generator 212 configured to generate the processor-specific bit-mask sequences MGa, MGb, MGc, MGd of second processors 106a, 106b, 106c, 106d. In other words, bit-mask generator 212 may be configured to generate the same bit-mask sequences MGa, MGb, MGc, MGd, e.g. same processor-specific bit-mask sequences, which are identical to those generated by and/or within the second processors 106a, 106b, 106c, 106d, or which may be specified to be used by the second processors, e.g. which may be allocated to a specific processor of the second processors 106a, 106b, 106c, 106d for use, and not to any other processor except for the allocated processor.

First processor 104 may be configured to bit-mask a data bit sequence BS to be transmitted to one second processor of plurality of second processors 106a, 106b, 106c, 106d using a processor-specific bit-mask sequence specific to the one second processor to thereby generate a processor-specific bit-masked data sequence to be transmitted to the one second processor. For example, first processor 104 may be configured to bit-mask a data bit sequence, e.g. BS, to be transmitted to one second processor 106a, of plurality of second processors 106a, 106b, 106c, 106d, using a processor-specific bit-mask sequence MGa, specific to the one second processor 106a, to thereby generate a processor-specific bit-masked data sequence BSMGa to be transmitted to the one second processor 106a. In this case, it may be understood that the processor-specific bit-mask sequence MGa may be specific to the one second processor 106a, as the same specific bit-mask sequence MGa, may be generated and used by the one second processor 106a, and not any other further second processor, e.g. 106b, 106c, 106d, which may generate their own processor-specific bit-mask sequences, e.g. MGb, MGc, MGd. As another example, first processor 104 may be configured to bit-mask a data bit sequence, e.g. BS, to be transmitted to one second processor 106b, of plurality of second processors 106a, 106b, 106c, 106d, using a processor-specific bit-mask sequence MGb, specific to the one second processor 106b, to thereby generate a processor-specific bit-masked data sequence BSMGb to be transmitted to the one second processor 106b. The examples may be applicable to each one second processor of plurality of second processors 106a, 106b, 106c, 106d, and so forth.

In other words, by means of individual masks, e.g. individual mask sequences, MGa, MGb, MGc, MGd, which may be selected from the bus master i.e. first processor 104, it may be possible to individually mask the data slave, e.g. with mask sequences MGa, MGb, MGc, MGd. The masked data BSMGa may reach the receiver, e.g. a second processor 106a, and any attempts to de-mask, through a non-authorised slave, e.g. 106b, may be sent to a data bin (not shown). Only a selected slave 106a may generate, e.g. generate internally, the correct mask, in order to successfully de-mask the data.

First processor 104 may be configured to bit-mask a data bit sequence to be transmitted to the one second processor using a processor-specific bit-mask sequence of the one second processor; and to bit-mask a data bit sequence to be transmitted to a further second processor using a further processor-specific bit-mask sequence of the further second processor. For example, First processor 104 may be configured to bit-mask a data bit sequence, e.g. data bit sequence BS1, to be transmitted to the one second processor 106a using a processor-specific bit-mask sequence MGa of one second processor 106b; and to bit-mask a data bit sequence, e.g. data bit sequence BS2, to be transmitted to further second processor 106b using a further processor-specific bit-mask sequence MGb of further second processor 106b.

One second processor may be configured to receive the specific bit-masked data sequence bit-masked by a processor-specific bit-mask sequence specific to the one second processor, and to retrieve the data bit sequence using the processor-specific bit-mask sequence specific to the one second processor. For example, one second processor 106a may be configured to receive specific bit-masked data sequence BS1MGa, which may have been bit-masked by processor-specific bit-mask sequence MGa specific to the one second processor 106a, and to retrieve the data bit sequence BS1 using processor-specific bit-mask sequence MGa specific to one second processor 106a. As bit-mask sequence MGa is specific to one second processor 106a, i.e. only one second processor 106a has access to bit-mask sequence MGa, only one second processor 106a may de-mask specific bit-masked data sequence BS1MGa, by using processor-specific bit mask sequence MGa to retrieve data bit sequence BS1. As a further example, further second processor 106b may be configured to receive specific bit-masked data sequence BS2MGb bit-masked by processor-specific bit-mask sequence MGb specific to the further second processor 106b, and to retrieve the data bit sequence BS2 using processor-specific bit-mask sequence MGb specific to further second processor 106b. As bit-mask sequence MGb is specific to further second processor 106b, i.e. only further second processor 106b has access to bit-mask sequence MGb, only further second processor 106a may de-mask specific bit-masked data sequence BS1MGb, by using processor-specific bit mask sequence MGb to retrieve data bit sequence BS2.

A further second processor without processor-specific bit-mask sequence MGa specific to one second processor, may be prevented from retrieving data bit sequence from specific bit-masked data sequence bit-masked by processor-specific bit-mask sequence specific to one second processor. For example, further second processor 106b without processor-specific bit-mask sequence MGa specific to one second processor 106a, may be prevented from retrieving data bit sequence BS1 from specific bit-masked data sequence BS1MGa bit-masked by processor-specific bit-mask sequence MGa specific to one second processor 106a.

It may be understood, that processor-specific bit-mask sequence MGa may be different from further processor-specific bit-mask sequence MGb, such that each processor specific bit-mask sequence may be unique from the other. Therefore, through the use of individual masks, an attack via another slave of the bus which may otherwise freely give out critical data, may be prevented, because the attack cannot start, nor detect the relevance of the data.

Normally, multiple peripherals may be connected as slaves to a master via a bus system. For example, multiple peripherals, such as plurality of second processors 106a, 106b, 106c, 106d, may be connected as slaves to a master, e.g. processor 104, via a bus system, e.g. bus lines 214. Therefore, processor arrangement 102 may include a multi-slave bus from a single master system.

According to an embodiment, as shown in FIG. 2, first processor 104 may include a bit-mask generator 212, wherein bit-mask generator 212 may include one or a plurality of shift registers 212a, 212b, 212c, 212d, 212e.

First processor 104 may include a bit-mask generator 212, wherein bit-mask generator 212 may include one or a plurality of shift registers 212a, 212b, 212c, 212d, 212e configured to generate the processor-specific bit-mask sequences MGa, MGb, MGc, MGd of second processors 106a, 106b, 106c, 106d.

Each shift register of the one or the plurality of shift registers 212a, 212b, 212c, 212d, 212e may be configured to generate a processor-specific bit-mask sequence specific to one second processor of plurality of second processors 106a, 106b, 106c, 106d. For example, one shift register 212a of plurality of shift registers 212a, 212b, 212c, 212d, 212e may be configured to generate a processor-specific bit-mask sequence MGa specific to one second processor 106a of plurality of second processors 106a, 106b, 106c, 106d. For example, a shift register, e.g. 212a, may be configured to generate a bit-mask sequence MGa, which may be specific to one second processor 106a of plurality of second processors 106a, 106b, 106c, 106d. As a further example, a shift register, e.g. 212b, may be configured to generate a bit-mask sequence MGb, which may be specific to one second processor 106b of plurality of second processors 106a, 106b, 106c, 106d.

Each of plurality of second processors 106a, 106b, 106c, 106d may include a bit-mask generator 108a, 108b, 108c, 108d, wherein each bit-mask generator 108a, 108b, 108c, 108d may include a shift register configured to generate a processor-specific bit-mask sequence MGa, MGb, MGc, MGd. For example, each of plurality of second processors, e.g. second processor 106a, may include a bit-mask generator, e.g. bit-mask generator 108a. For example, each bit-mask generator, e.g. bit-mask generator 108a, may include a shift register configured to generate a processor-specific bit-mask sequence, e.g. MGa. Each of plurality of second processors, e.g. second processor 106a, may include a bit-mask generator, e.g. bit-mask generator 108a. As another example, a further second processor, e.g. 106b, may include a further bit-mask generator, e.g. bit-mask generator 108b, which may include a shift register configured to generate a further processor-specific bit-mask sequence, e.g. MGb.

Figure 3:
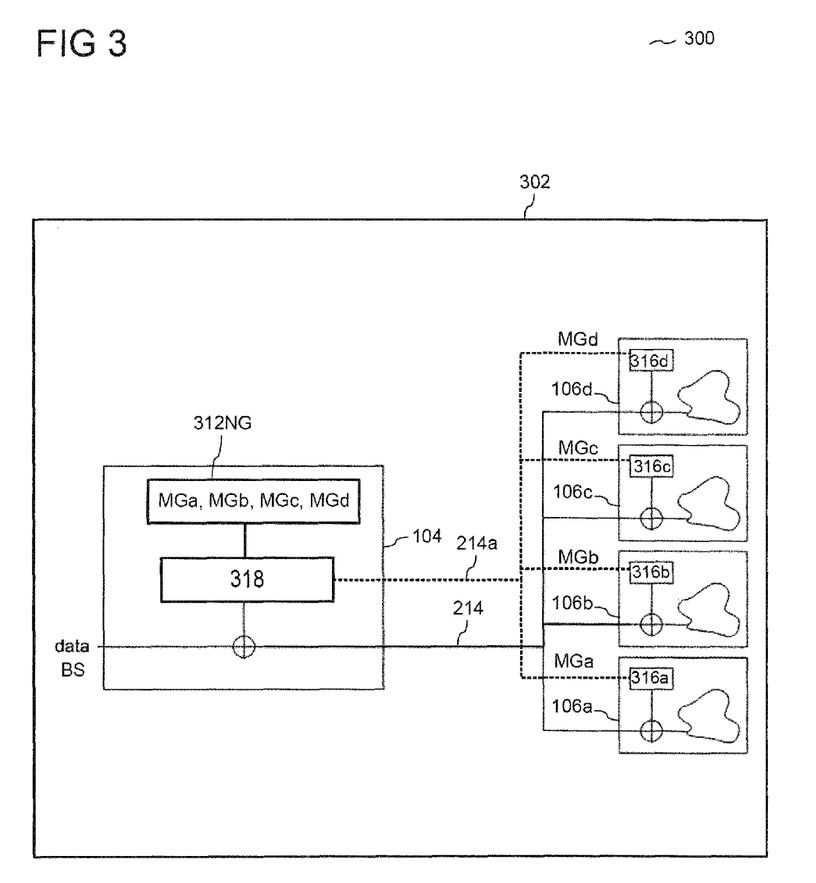
FIG. 3 shows a processor arrangement according to an embodiment.

FIG. 3 shows processor arrangement 302 according to an embodiment.

Processor arrangement 302 may include: first processor 104; plurality of second processors 106a, 106b, 106c, 106d each second processor 106a, 106b, 106c, 106d including a bit-mask generator (not shown, see e.g. bit-mask generators 108a-108d in FIG. 2) configured to generate a processor-specific bit-mask sequence MGa, MGb, MGc, MGd; wherein first processor 104 may include bit-mask generator 312NG configured to generate the processor-specific bit-mask sequences MGa, MGb, MGc, MGd of second processors 106a, 106b, 106c, 106d; wherein first processor 104 may be configured to bit-mask a data bit sequence BS to be transmitted to one second processor of plurality of second processors 106a, 106b, 106c, 106d using a processor-specific bit-mask sequence specific to the one second processor to thereby generate a processor-specific bit-masked data sequence to be transmitted to the one second processor.

Processor arrangement 302 may include one or more or all of the features already described with respect to processor arrangements 102, 202, except that according to an embodiment, first processor 104 may include bit-mask generator 312NG, wherein bit-mask generator 312NG may include a true random number generator (TRNG). According to another embodiment, first processor 104 may include bit-mask generator 312NG, wherein bit-mask generator 312NG may include a pseudo random number generator (PRNG).

First processor 104 may include bit-mask generator 312NG, e.g. a TRNG, or, e.g. a PRNG configured to generate a plurality of different processor-specific bit-mask sequences MGa, MGb, MGc, MGd, wherein first processor 104 may be configured to transmit a processor-specific bit-mask sequence specific to one second processor of the plurality of second processors, to the one second processor of the plurality of second processors, and to transmit a further processor-specific bit-mask sequence specific to a further second processor of the plurality of second processors, to the further second processor of the plurality of second processors. For example, first processor 104 may be configured to transmit a processor-specific bit-mask sequence MGa specific to one second processor 106a of plurality of second processors 106a, 106b, 106c, 106d, to the one second processor 106a of plurality of second processors 106a, 106b, 106c, 106d, and to transmit a further processor-specific bit-mask sequence MGb specific to a further second processor 106b of the plurality of second processors 106a, 106b, 106c, 106d, to the further second processor 106b of the plurality of second processors 106a, 106b, 106c, 106d. It may be understood that a transmitted processor-specific bit-mask sequence may be used only by a specifically selected second processor and not by any other further second processors. In other words, first processor 104 may be configured to transmit a processor-specific bit-mask sequence MGa specific to one second processor 106a of plurality of second processors 106a, 106b, 106c, 106d, to the one second processor 106a and not to any further second processors, e.g. 106b, 106c, 106d, and to transmit a further processor-specific bit-mask sequence MGb specific to a further second processor 106b of the plurality of second processors 106a, 106b, 106c, 106d, to the further second processor 106b, and not to any further second processors, e.g. 106a, 106c, 106d.

One second processor may be configured to receive and store the processor-specific bit-mask sequence and further second processor from the plurality of second processors may be configured to receive and store the further processor-specific bit-mask sequence. For example, one second processor 106a may be configured to receive and store the processor-specific bit-mask sequence MGa and further second processor 106b may be configured to receive and store the further processor-specific bit-mask sequence MGb.

With processor-specific bit-mask sequence MGa stored in one second processor 106a and further processor-specific bit-mask sequence MGb stored in further second processor 106b, one second processor 106a may also be configured to receive specific bit-masked data sequence BS1MGa, which may have been bit-masked by first processor 104 using processor-specific bit-mask sequence MGa, and one second processor 106a may be configured to retrieve the data bit sequence BS1 using processor-specific bit-mask sequence MGa specific to one second processor 106a, wherein processor-specific bit-mask sequence MGa may have been transmitted from processor 104 to one second processor 106a, and wherein processor-specific bit-mask sequence MGa may be specific to one second processor 106a. Furthermore, further second processor 106b may be configured to receive specific bit-masked data sequence BS2MGb which may have been bit-masked by first processor 104 using processor-specific bit-mask sequence MGb, and further second processor 106b may be configured to retrieve the data bit sequence BS2 using processor-specific bit-mask sequence MGb specific to further second processor 106b, wherein processor-specific bit-mask sequence MGa may have been transmitted from processor 104 to further second processor 106b, and wherein processor-specific bit-mask sequence MGb may be specific to further second processor 106b.

According to an embodiment, each of plurality of second processors 106a, 106b, 106c, 106d may include a memory 316a, 316b, 316c, 316d configured to store received processor-specific bit-mask sequences MGa, MGb, MGc, MGd. According to another embodiment, each of plurality of second processors 106a, 106b, 106c, 106d may include an address space configured to store received processor-specific bit-mask sequences.

First processor 104 may optionally include memory 318 configured to store the generated plurality of different processor-specific bit-mask sequences MGa, MGb, MGc, MGd. Plurality of different processor-specific bit-mask sequences MGa, MGb, MGc, MGd may be transmitted from memory 318 to the specific plurality of second processors 106a, 106b, 106c, 106d via one or more bus lines, e.g. 214, e.g. 214a.

It may be understood that according to various embodiments, the embodiments already described with respect to FIGS. 1 to 3, may even include targeting a group of specific second processors. So far, a processor-specific sequence has been shown to include a bit-mask sequence which may be specific only to one second processor. For example, first processor 104 may be configured to transmit a processor-specific bit-mask sequence MGa specific to one second processor 106a of plurality of second processors 106a, 106b, 106c, 106d; in other words, to the one second processor 106a and not to any further second processors, e.g. 106b, 106c, 106d. However, it may be understood that according to other embodiments, a processor-specific bit-mask sequence may be specific to a specific group of second processors, the specified group of second processor including one or more second processors. For example, first processor 104 may be configured to transmit a processor-specific bit-mask sequence MGab specific to a group of second processors 106a, 106b of plurality of second processors 106a, 106b, 106c, 106d. In other words, only the specified group of second processors 106a, 106b may be allocated use of the specific bit-mask sequence MGab, e.g. either by generating the identical bit-mask sequence MGab, or receiving and storing the bit-mask sequence MGab which may be transmitted from first processor 104. It may be understood that only the specified group of second processors 106a, 106b may be able to use processor-specific bit-mask sequence MGab to retrieve the data sequence.

Figure 4:
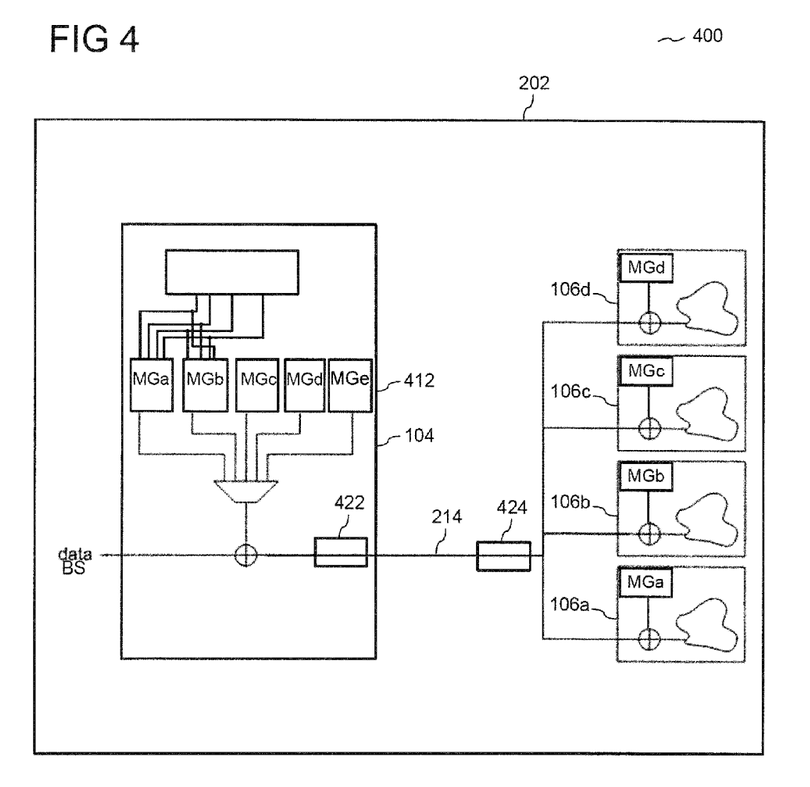
FIG. 4 shows a processor arrangement according to an embodiment.

FIG. 4 shows processor arrangement 402 according to an embodiment.

Processor arrangement 402 may include one or more or all of the features already described with respect to processor arrangements 102, 202, 302, except that bit-mask generator 412, may include a shift register. The shift-register 412 may include multiple outputs which may be hardwired to produce a plurality of different processor-specific bit-mask sequences MGa, MGb, MGc, MGd. The different processor-specific bit-mask sequences MGa, MGb, MGc, MGd may each be transmitted to a specific second processor of the plurality of second processors 106a, 106b, 106c, 106d, wherein they may each be stored in the plurality of second processors 106a, 106b, 106c, 106d. According to other embodiments, instead of transmitting the bit-mask sequences MGa, MGb, MGc, MGd to the plurality of second processors, plurality of second processors 106a, 106b, 106c, 106d may include a bit-mask generator (not shown), e.g. which may also include a shift register, hardwired to produce the plurality of different processor-specific bit-mask sequences MGa, MGb, MGc, MGd.

According to various embodiments, for example, embodiments already described with respect to processor arrangements 102, 202, 302, 402, first processor 104 and plurality of second processors 106a, 106b, 106c, 106d may be integrated in a single device. First processor 104 and plurality of second processors 106a, 106b, 106c, 106d may be integrated in a chip card device, e.g. smart card according to ISO/IEC 7810. First processor 104 may include transmitter 422 configured to transmit a processor-specific bit-masked data sequence to the one second processor; and plurality of second processors 106a, 106b, 106c, 106d may include a receiver 424 configured to receive second processor-specific bit-masked data sequences from the first processor. Although the transmitter-receiver are only shown in processor arrangement 402, it may be understood that these they may also be included processor arrangements 102, 202, 302.

Various embodiments, for example, embodiments already described with respect to processor arrangements 102, 202, 302, 402 in FIGS. 1 to 4, show the construction of a single master multi slave bus system (processor arrangement 102, 202, 302, 402) wherein a slave-individual mask may be applied via the different mask generators, e.g. 108a, 108b, 108c, 108d and 112a, 112b, 112c, 112d. Every slave, e.g. every second processor 106, may belongs correspondingly to a generator, e.g. a bit-mask generator, which may synchronize the mask generation (As shown in embodiments in FIG. 2). The mask generator may be generated in a very simple execution from a general shift register. For example, every mask generator can be its own shift register with its own polynomial (as shown in FIG. 2). Alternatively, the individual masks may be generated through different permutations of the shift registers (as shown in embodiments in FIG. 4). Alternatively, number generators, e.g. TRNG, e.g. PRNG, may be used to generate its own polynomial (as shown in FIG. 3).

As shown in FIGS. 2 and 4, additional masks, e.g. MGe may be chosen, to provide access to unused areas of the address space with an individual mask. As a result, the data arrives only as data trash at slaves, e.g. the data may be masked with bit-sequence MGe, which may be used for masking data trash. It may be particularly crucial, when there are slaves which do not work with masked data adjacent to slaves which do use masks. Because of that, an attack on an address, which may have originally been assigned to a secure slave which no longer exists, may stay without consequence, because the data is sent to the trash.

Figure 5:
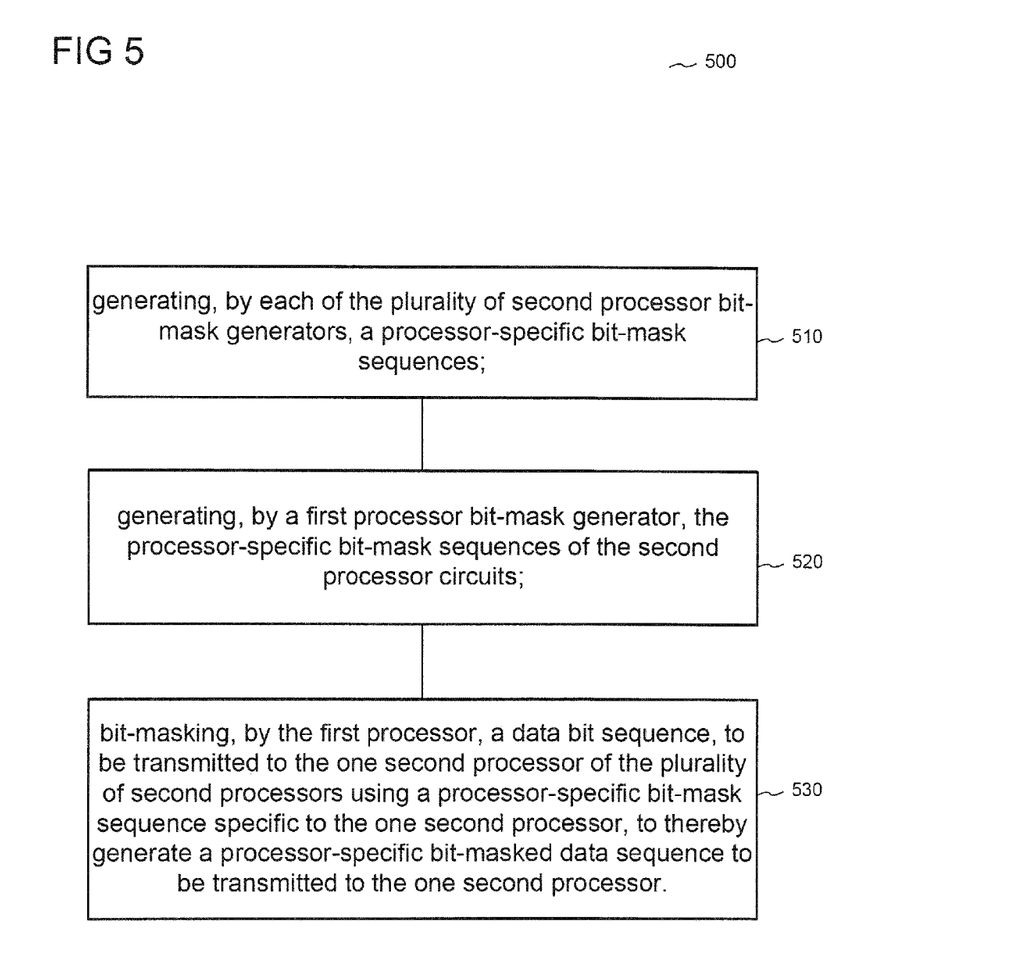
FIG. 5 shows a method for transmitting a data bit sequence according to an embodiment.

FIG. 5 shows method 500 for transmitting a data bit sequence according to an embodiment.

Method 500 may include:

generating, by each of the plurality of second processor bit-mask generators, a processor-specific bit-mask sequences (in 510);

generating, by a first processor bit-mask generator, the processor-specific bit-mask sequences of the second processor circuits (in 520);

bit-masking, by the first processor, a data bit sequence, to be transmitted to the one second processor of the plurality of second processors using a processor-specific bit-mask sequence specific to the one second processor, to thereby generate a processor-specific bit-masked data sequence to be transmitted to the one second processor (in 530).

Various embodiments provide a processor arrangement, including: a first processor circuit; a plurality of second processor circuits, each of the plurality of second processor circuits including a bit-mask generation circuit configured to generate a processor-specific bit-mask sequence; wherein the first processor circuit includes a bit-mask generation circuit configured to generate the processor-specific bit-mask sequences of the second processor circuits; wherein the first processor circuit is configured to bit-mask a data bit sequence to be transmitted to one second processor circuit of the plurality of second processors using a bit-mask sequence specific to the one second processor circuit, to thereby generate a processor circuit-specific bit-masked data sequence to be transmitted to the one second processor circuit.

Various embodiments provide a processor arrangement, including: a first processor; a plurality of second processors, each second processor including a bit-mask generator configured to generate a processor-specific bit-mask sequence; wherein the first processor includes a bit-mask generator configured to generate the processor-specific bit-mask sequences of the second processors; wherein the first processor is configured to bit-mask a data bit sequence to be transmitted to one second processor of the plurality of second processors using a processor-specific bit-mask sequence specific to the one second processor, to thereby generate a processor-specific bit-masked data sequence to be transmitted to the one second processor.

According to an embodiment, the first processor includes a central processing unit.

According to an embodiment, the first processor and the plurality of second processors are connected via one or more bus lines.

According to an embodiment, the first processor includes a master processing circuit and the plurality of second processors each includes a slave processing circuit.

According to an embodiment, the first processor includes a bit-mask generator, wherein the bit-mask generator includes a plurality of shift registers.

According to an embodiment, the first processor includes a bit-mask generator, wherein the bit-mask generator includes a plurality of shift registers configured to generate the processor-specific bit-mask sequences of the second processors; wherein one shift register of the plurality of shift registers is configured to generate a processor-specific bit-mask sequence specific to one second processor of the plurality of second processors, According to an embodiment, each of the plurality of second processors includes a bit-mask generator, wherein each bit-mask generator includes a shift register configured to generate a processor-specific bit-mask sequence.

According to an embodiment, the first processor includes a bit-mask generator, wherein the bit-mask generator includes a true random number generator.

According to an embodiment, the first processor includes a bit-mask generator, wherein the bit-mask generator includes a pseudo random number generator.

According to an embodiment, the first processor includes a bit-mask generator configured to generate a plurality of different processor-specific bit-mask sequences, wherein the first processor is configured to transmit a processor-specific bit-mask sequence specific to one second processor of the plurality of second processors, to the one second processor of the plurality of second processors, and to transmit a further processor-specific bit-mask sequence specific to a further second processor of the plurality of second processors, to the further second processor of the plurality of second processors.

According to an embodiment, the one second processor is configured to receive and store the processor-specific bit-mask sequence and wherein the further second processor from the plurality of second processors is configured to receive and store the further processor-specific bit-mask sequence.

According to an embodiment, each of the plurality of second processors includes a memory configured to store received processor-specific bit-mask sequences.

According to an embodiment, each of the plurality of second processors includes an address space configured to store received processor-specific bit-mask sequences.

According to an embodiment, the first processor includes a bit-mask generator, wherein the bit-mask generator includes a shift register.

According to an embodiment, the first processor is configured to bit-mask a data bit sequence to be transmitted to the one second processor using a processor-specific bit-mask sequence of the one second processor; and to bit-mask a data bit sequence to be transmitted to a further second processor using a further processor-specific bit-mask sequence of the further second processor.

According to an embodiment, the one second processor is configured to receive the specific bit-masked data sequence bit-masked by a processor-specific bit-mask sequence specific to the one second processor, and to retrieve the data bit sequence using the processor-specific bit-mask sequence specific to the one second processor.

According to an embodiment, a further second processor without a processor-specific bit-mask sequence specific to the one second processor, is prevented from retrieving the data bit sequence from the specific bit-masked data sequence bit-masked by a processor-specific bit-mask sequence specific to the one second processor.

According to an embodiment, the first processor and the plurality of second processors are integrated in a single device.

According to an embodiment, the first processor and the plurality of second processors are integrated in a chip card device.

According to an embodiment, the first processor includes a transmitter configured to transmit a processor-specific bit-masked data sequence to the one second processor; and wherein the plurality of second processors includes a receiver configured to receive second processor-specific bit-masked data sequences from the first processor.

Various embodiments provide a processor arrangement, including: a first processor circuit; a plurality of second processor circuits, each of the plurality of second processor circuits including a bit-mask generation circuit configured to generate a processor-specific bit-mask sequence; wherein the first processor circuit includes a bit-mask generation circuit configured to generate the processor-specific bit-mask sequences of the second processor circuits; wherein the first processor circuit is configured to bit-mask a data bit sequence to be transmitted to one second processor circuit of the plurality of second processors using a bit-mask sequence specific to the one second processor circuit, to thereby generate a processor circuit-specific bit-masked data sequence to be transmitted to the one second processor circuit.

Various embodiments provide a method for transmitting a data bit sequence, the method including: generating, by each of the plurality of second processor bit-mask generators, a processor-specific bit-mask sequences; generating, by a first processor bit-mask generator, the processor-specific bit-mask sequences of the second processor circuits; bit-masking, by the first processor, a data bit sequence, to be transmitted to the one second processor of the plurality of second processors using a processor-specific bit-mask sequence specific to the one second processor, to thereby generate a processor-specific bit-masked data sequence to be transmitted to the one second processor.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A processor arrangement, comprising: a first processor; a plurality of second processors, each second processor comprising a bit-mask generator configured to generate a processor-specific bit-mask sequence; wherein the first processor comprises a bit-mask generator configured to generate the processor-specific bit-mask sequences of the second processors; wherein the first processor is configured to bit-mask a data bit sequence to be transmitted to one second processor of the plurality of second processors using a processor-specific bit-mask sequence specific to the one second processor, to thereby generate a processor-specific bit-masked data sequence to be transmitted to the one second processor, wherein the first processor comprises a bit-mask generator, wherein the bit-mask generator comprises a plurality of shift registers configured to generate the processor-specific bit-mask sequences of the second processors; wherein one shift register of the plurality of shift registers is configured to generate a processor-specific bit-mask sequence specific to one second processor of the plurality of second processors.

2. The processor arrangement according to claim 1, wherein the first processor comprises a central processing unit.

3. The processor arrangement according to claim 1, wherein the first processor and the plurality of second processors are connected via one or more bus lines.

4. The processor arrangement according to claim 1, wherein the first processor comprises a master processing circuit and wherein the plurality of second processors each comprises a slave processing circuit.

5. The processor arrangement according to claim 1, wherein the first processor comprises a bit-mask generator, wherein the bit-mask generator comprises a plurality of shift registers.

6. The processor arrangement according to claim 1, wherein each of the plurality of second processors comprises a bit-mask generator, wherein each bit-mask generator comprises a shift register configured to generate a processor-specific bit-mask sequence.

7. The processor arrangement according to claim 1, wherein the first processor comprises a bit-mask generator, wherein the bit-mask generator comprises a true random number generator.

8. The processor arrangement according to claim 1, wherein the first processor comprises a bit-mask generator, wherein the bit-mask generator comprises a pseudo random number generator.

9. The processor arrangement according to claim 1, wherein the first processor comprises a bit-mask generator configured to generate a plurality of different processor-specific bit-mask sequences, wherein the first processor is configured to transmit a processor-specific bit-mask sequence specific to one second processor of the plurality of second processors, to the one second processor of the plurality of second processors, and to transmit a further processor-specific bit-mask sequence specific to a further second processor of the plurality of second processors, to the further second processor of the plurality of second processors.

10. The processor arrangement according to claim 9, wherein the one second processor is configured to receive and store the processor-specific bit-mask sequence and wherein the further second processor from the plurality of second processors is configured to receive and store the further processor-specific bit-mask sequence.

11. The processor arrangement according to claim 10, wherein each of the plurality of second processors comprises a memory configured to store received processor-specific bit-mask sequences.

12. The processor arrangement according to claim 10, wherein each of the plurality of second processors comprises an address space configured to store received processor-specific bit-mask sequences.

13. The processor arrangement according to claim 1, wherein the first processor comprises a bit-mask generator, wherein the bit-mask generator comprises a shift register.

14. The processor arrangement according to claim 1, wherein the first processor is configured to bit-mask a data bit sequence to be transmitted to the one second processor using a processor-specific bit-mask sequence of the one second processor; and to bit-mask a data bit sequence to be transmitted to a further second processor using a further processor-specific bit-mask sequence of the further second processor.

15. The processor arrangement according to claim 1, wherein the one second processor is configured to receive the specific bit-masked data sequence bit-masked by a processor-specific bit-mask sequence specific to the one second processor, and to retrieve the data bit sequence using the processor-specific bit-mask sequence specific to the one second processor.

16. The processor arrangement according to claim 15, wherein a further second processor without a processor-specific bit-mask sequence specific to the one second processor, is prevented from retrieving the data bit sequence from the specific bit-masked data sequence bit-masked by a processor-specific bit-mask sequence specific to the one second processor.

17. The processor arrangement according to claim 1, wherein the first processor and the plurality of second processors are integrated in a single device.

18. The processor arrangement according to claim 1, wherein the first processor and the plurality of second processors are integrated in a chip card device.

19. The processor arrangement according to claim 1, wherein the first processor comprises a transmitter configured to transmit a processor-specific bit-masked data sequence to the one second processor; and wherein the plurality of second processors comprises a receiver configured to receive second processor-specific bit-masked data sequences from the first processor.

20. A processor arrangement, comprising: a first processor circuit; a plurality of second processor circuits, each of the plurality of second processor circuits comprising a bit-mask generation circuit configured to generate a processor-specific bit-mask sequence; wherein the first processor circuit comprises a bit-mask generation circuit configured to generate the processor-specific bit-mask sequences of the second processor circuits; wherein the first processor circuit is configured to bit-mask a data bit sequence to be transmitted to one second processor circuit of the plurality of second processors using a bit-mask sequence specific to the one second processor circuit, to thereby generate a processor circuit-specific bit-masked data sequence to be transmitted to the one second processor circuit wherein the first processor comprises a bit-mask generator, wherein the bit-mask generator comprises a plurality of shift registers configured to generate the processor-specific bit-mask sequences of the second processors; wherein one shift register of the plurality of shift registers is configured to generate a processor-specific bit-mask sequence specific to one second processor of the plurality of second processors.

21. A method for transmitting a data bit sequence, the method comprising: generating, by each of a plurality of second processor bit-mask generators, a processor-specific bit-mask sequences; generating, by a first processor bit-mask generator, the processor-specific bit-mask sequences of the second processor circuits; bit-masking, by the first processor, a data bit sequence, to be transmitted to the one second processor of the plurality of second processors using a processor-specific bit-mask sequence specific to the one second processor, to thereby generate a processor-specific bit-masked data sequence to be transmitted to the one second processor, wherein the first processor comprises a bit-mask generator, wherein the bit-mask generator comprises a plurality of shift registers configured to generate the processor-specific bit-mask sequences of the second processors; wherein one shift register of the plurality of shift registers is configured to generate a processor-specific bit-mask sequence specific to one second processor of the plurality of second processors.

\* \* \* \* \*